United States Patent [19]
Yamazaki et al.

[11] Patent Number: 5,814,217
[45] Date of Patent: Sep. 29, 1998

[54] MAGNETIC SEPARATOR FOR NEEDLE-SHAPED CHIPS

[75] Inventors: Minoru Yamazaki, Nagoya; Hidenori Sano, Kariya, both of Japan

[73] Assignee: CNK Co., Ltd., Kariya, Japan

[21] Appl. No.: 773,771

[22] Filed: Dec. 24, 1996

[30] Foreign Application Priority Data

Jul. 23, 1996 [JP] Japan .................................. 8-225792

[51] Int. Cl.[6] .................................................. B01D 35/06
[52] U.S. Cl. ........................... 210/222; 210/396; 210/402
[58] Field of Search ................................... 209/219, 229, 209/231, 232; 210/222, 396, 402

[56] References Cited

U.S. PATENT DOCUMENTS

| | | | |
|---|---|---|---|
| 4,279,760 | 7/1981 | Yamamoto | 210/402 |
| 4,686,035 | 8/1987 | Estabrook | 210/222 |
| 5,496,470 | 3/1996 | Lenhart | 210/222 |

*Primary Examiner*—David A. Reifsnyder
*Attorney, Agent, or Firm*—Oblon, Spivak, McClelland, Maier & Neustadt, P.C.

[57] ABSTRACT

A magnetic separator for purifying coolant including sludge mainly comprising needle-shaped chips for the purpose of recycling. A comb-type guide plate formed of a magnetic substance material is provided before a squeezing roller, in such a manner that convex and concave portions are in conformity with the magnetic lines of force produced by the arrangement of magnets of a fixed magnet-group cylinder stored in a rotary cylinder. Thus, magnetic flux curtains are formed between the convex portions and the rotary cylinder. Needle-shaped chips which have come as attracted sludge standing in the shape of a jet on the outer peripheral surface of the rotary cylinder are interrupted from going ahead by the magnetic flux curtains, and become accumulated sludge, and are led to lying attracted sludge on the left and right sides. Thus, the attracted sludge is prevented from stabbing a squeezing roller, and operations of extracting liquid from the sludge are continued without causing any trouble.

8 Claims, 5 Drawing Sheets

MAGNETIC SEPARATOR FOR NEEDLE-SHAPED CHIPS

BACKGROUND OF THE INVENTION

1. Field of the Invention

A magnetic separator according to the present invention is employed in order to purify a liquid, for example, coolant which has been used in the shaving machine, including sludge mainly comprising needle-shaped chips made of a magnetic substance material. In such magnetic separator, the needle-shaped chips stab a squeezing rubber roller, and this causes insufficient liquid extraction. In the present invention, the squeezing roller can satisfactorily extract liquid from sludge for a long time so that it can be used for a long time. Thus, the magnetic separator according to the present invention attains improved working efficiency.

2. Description of the Prior Art

FIGS. 4 and 5 show an example that a conventional magnetic separator is used in purifying, for the purpose of recycling, coolant including sludge mainly comprising needle-shaped chips made of the magnetic substance material. At each longitudinal end of the needle-shaped chips made of a magnetic substance material attracted on the outer peripheral surface of a rotary magnetic cylinder 52, north and south magnetic poles are formed.

So, the attracted needle-shaped chips rise up in accordance with the magnetic field formed by magnets 55 of a fixed magnet-group cylinder 54 stored in the rotary magnetic cylinder 52. When such rising needle-shaped chips are pressed by a squeezing roller 56 for extracting liquid, they stab a rubber portion of the squeezing roller 56, and gradually heap up in a pile. As a result, the surface of the squeezing roller 56 becomes to have a striped pattern 58 with annular convexes and concaves. Since this causes poor extraction of liquid from the sludge, the frequent exchange of the squeezing roller 56 is inevitably required.

As mentioned above, in purifying coolant including sludge mainly comprising needle-shaped chips made of a magnetic substance material, the conventional magnetic separator 51 has a problem: Needle-shaped chips stab the squeezing roller 56 and gradually heap up in a pile, and make the surface of the squeezing roller 56 have a striped pattern with annular convexes and concaves, so that the squeezing roller 56 becomes to have poor liquid extraction and is required to be exchanged frequently.

SUMMARY OF THE INVENTION

The present invention has been conceived in order to dissolve the above problem. It is therefore an object of the present invention to provide a magnetic separator for magnetically separating chips from liquid which avoids complicated structure, and at the same time, improves its durability.

The magnetic separator of the present invention for separating chips made of magnetic substance material from liquid with a sludge comprises;

a transfer means for transferring the chips, which transfers the chips attracted on a transfer surface of the transfer means toward a predetermined transfer direction, a magnetic means for attracting the chips, which is disposed inside of the transfer means, has a N pole surface and a S pole surface disposed near the transfer surface of the transfer means and attracts the chips to the transfer surface of the transfer means, a pressing means for pressing the chips, which has elastical member, presses the chips attracted on the transfer surface of the transfer means and separates the chips from the liquid, wherein the magnetic separator has a guide means which is disposed near the pressing means and faces the transfer surface of the transfer means with a predetermined short distance in order to bring down the chips attracted and rising up near a central portion of each pole surface of the magnet means before the chips are pressed by the pressing means.

Namely, in the above magnetic separator, the guide means mechanically brings down the chips attracted and rising up on the transfer surface of the transfer means over the central portion of each pole surface of the magnetic means. The chips made of magnetic substance material, which are disposed over the central portion of each pole surface of the magnetic means, are rose up by the magnetic field formed near the central portion of each pole surface. Further, if the guide means is made of magnetic substance material, the guide means can magnetically bring down the rising chips.

We found an important facts that the chips brought down by the guide means do not rise up again till the chips arrives at the pressing means. Its reason is difficult and we can not understand completely. However, we think the chips brought down gives influence each other and gathers in the small space on the transfer surface of the transfer means between the guide means and the pressing means. So, each chips can not rise up again because each chip is not independent mechanically and magnetically from the other chips.

Accordingly, the magnetic separator of the present invention achieves the problem that the chips are inserted in the elastical surface of the pressing means and hurt it.

In the first aspect of the present invention, the magnetic separator of the present invention has plural N pole surfaces and S pole surfaces arranged alternatively in a different direction from the transfer direction along the transfer surface of the transfer means.

Accordingly, the magnetical force attracts the chips toward the transfer surface can increase because the distance between the N pole surfaces and the S pole surfaces being adjacent to each other can be shortened.

In the second aspect of the present invention, the chips have a needle shaped form rotated at a predetermined rotation speed.

In the third aspect of the present invention, the transfer means consists of a nonmagnetic rotary cylinder made of nonmagnetic substance material.

Accordingly, the chips can be easily separated at a predetermined portion apart from the magnetic means and the system transferring the chips can become simple.

In the fourth aspect of the present invention, the magnetic means consists of a non-moved permanent magnet of which each pole surface faces an inner peripheral surface of the nonmagnetic rotary cylinder.

Accordingly, the transfer means can be easily apart from the magnetic means.

In the fifth aspect of the present invention, the pressing means consists of an elastical roller of which an elastical outer peripheral surface.

Accordingly, the pressing means can be achieved simply and the roller can be employed for a long period.

In the sixth aspect of the present invention, the guide means consists of a plate member disposed in an axial direction of the nonmagnetic rotary cylinder and facing an outer peripheral surface of the nonmagnetic rotary cylinder with a predetermined short distance.

Accordingly, the plate member can simply and mechanically bring down without a complicate tools and apparatus.

In the seventh aspect of the present invention, the plate member has plural convex portions disposed near the central portion of each pole surface of the magnet means.

Accordingly, the plate member can be brought down the rising chips without making of confusion of the lying chips attracted on the transfer surface of the nonmagnetic rotary cylinder positioned near the peripheral portion of each pole surface of the magnetic means and without giving confusion.

In the eighth aspect of the present invention, the plate member is made of magnetic substance material and consists of the plural convex portions and a main portion.

Accordingly, the magnetized convex portions attract the one edge of the rising chips attracted over the central portion of the magnetic portion.

As a result, the chips are brought down on the outer periphery surface of the nonmagnetic rotary cylinder by the contacting shock with the convex portions and the magnetic force applied to the chips toward the transfer direction (peripheral direction). When the other edge of the chips attracting on the outer peripheral surface are going apart from the convex portions of the guide plate, the chips lies in the peripheral direction on the outer peripheral surface of the nonmagnetic rotary cylinder.

For example, the magnetic separator for needle-shaped chips according to the present invention purifies the coolant which has been used for processing by machine tools or other general processing and which includes sludge mainly comprising needle-shaped chips made of a magnetic substance material. The magnetic separator of the present invention passes the coolant in a passage formed between a rotary magnetic cylinder (hereinafter referred to as a rotary cylinder) comprising a rotary nonmagnetic tube and a fixed magnet-group cylinder stored in the rotary nonmagnetic tube, and a base plate formed at a certain distance from the rotary magnetic cylinder. As a result, the sludge in the coolant is attracted on the outer peripheral surface of the rotary magnetic cylinder. Liquid is extracted from the attracted sludge by the squeezing roller which always presses the attracted sludge against the outer peripheral surface of the rotary magnetic cylinder. The feature of the present invention resides in that the magnetic separator of the present invention has a comb-type guide plate formed of a magnetic substance material which are aligned with the arranged direction of the magnets of the fixed (non-moved) magnet-group cylinder, and disposed near the outer peripheral surface of the rotary magnetic cylinder just before the squeezing roller, in order to give preferable posture to the attracted needle-shaped chips which rise in accordance with the magnetic field.

In operation, the magnetic separator according to the present invention passes coolant including sludge mainly comprising needle-shaped chips made of a magnetic substance material, in a passage between a rotary cylinder comprising a rotary nonmagnetic tube and a fixed (non-moved) magnet-group cylinder stored in the rotary nonmagnetic tube, and a semicylindrical base plate formed at a certain distance from the rotary cylinder, makes the sludge of a magnetic substance material in the coolant attracted by the fixed magnet-group cylinder so as to make the sludge attracted on the outer peripheral surface of the rotary cylinder, and presses the attracted sludge against the outer peripheral surface of the rotary cylinder by the squeezing roller to extract liquid from the sludge and discharges the needle-shaped chips. With regard to the magnetic field around the outer peripheral surface of the rotary cylinder, when the magnets of the magnet-group cylinder are arranged in such a manner that south poles and north poles are arranged alternately in the axial direction of the rotary cylinder, magnetic force line takes the shortest course in such a manner not to cross each other, and magnetic force is stronger as the distance magnetic force line travels is shorter. Therefore, the magnets of different poles are alternately arranged side by side. In adjoining portions of north poles and south poles, magnetic force is strong and magnetic force lines are parallel to the outer peripheral surface of the rotary cylinder. On the other hand, in intermediate (central) portions of the respective magnets, magnetic force is weak, and magnetic force lines is formed in the radial direction of the rotary cylinder from the outer peripheral surface of the rotary cylinder. Therefore, since the needle-shaped chips made of a magnetic substance material attracted on the outer peripheral surface of the rotary cylinder come to have north and south magnetic poles at each longitudinal end, the needle-shaped chips lie down on the outer peripheral surface of the rotary cylinder in accordance with the magnetic field lines around the adjoining portions of the respective magnets of the magnet-group cylinder, and the needle-shaped chips rise up in the radial direction of the rotary cylinder from the outer peripheral surface at the intermediate (central) portions of the respective magnet pole surfaces of the magnets. These standing chips are led to the lying positions on both the sides by the guide plate according to the present invention provided just before the squeezing roller.

This guide plate is formed of a magnetic substance material. The guide plate are not in contact with the outer peripheral surface of the rotary cylinder but in the vicinity of the outer peripheral surface of the rotary cylinder. In the preferred aspect of the present invention, the guide plate has a comb-shaped form. The plurality of convex portions of the comb-type guide plate are located in conformity with the intermediate (central) portions of the respective magnets of the fixed magnet-group cylinder, while concave portions of the comb-type guide plate are located in conformity with the adjoining portions of neighboring two magnets. Therefore, magnetic flux curtains are formed between the convex portions of the comb-type guide plate magnetized by the magnets, and the outer peripheral surface of the rotary cylinder. When the rotary cylinder rotates, the attracted standing chips are interrupted from going by the magnetic flux curtains and accumulated there, and guided to the adjoining portions of the neighboring two magnets on both the sides where magnetic force is stronger. That is to say, after the attracted sludge all lies down, the sludge is pressed by the squeezing roller. Consequently, the operation of extracting liquid from the attracted sludge is continued without causing the needle-shaped chips to stab the squeezing roller.

BRIEF DESCRIPTION OF THE DRAWINGS

The exact nature of this invention, as well as other objects and advantages thereof, will be readily apparent from consideration of the following specification relating to the annexed drawings in which.

DETAILED DESCRIPTION OF THE PREFERRED EMBODIMENT

Figure 1:
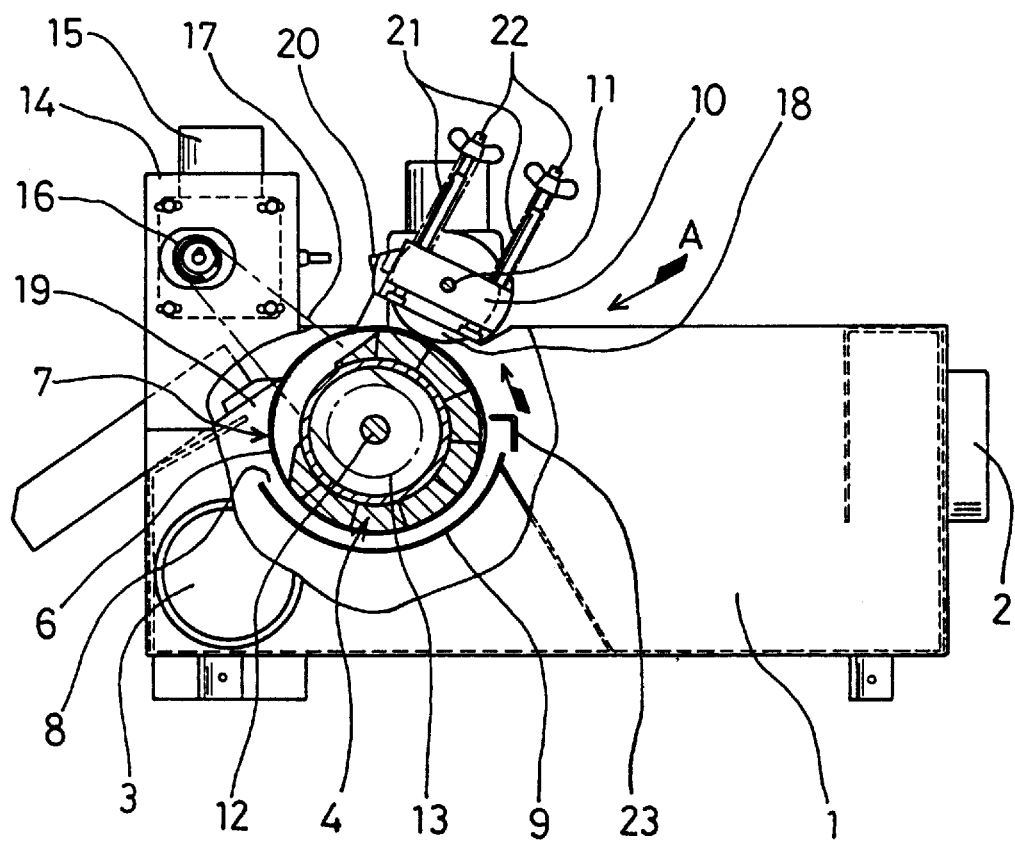
FIG. 1 is a front view, partly in cross section, of a magnetic separator for needle-shaped chips according to the present invention.
Figure 2:
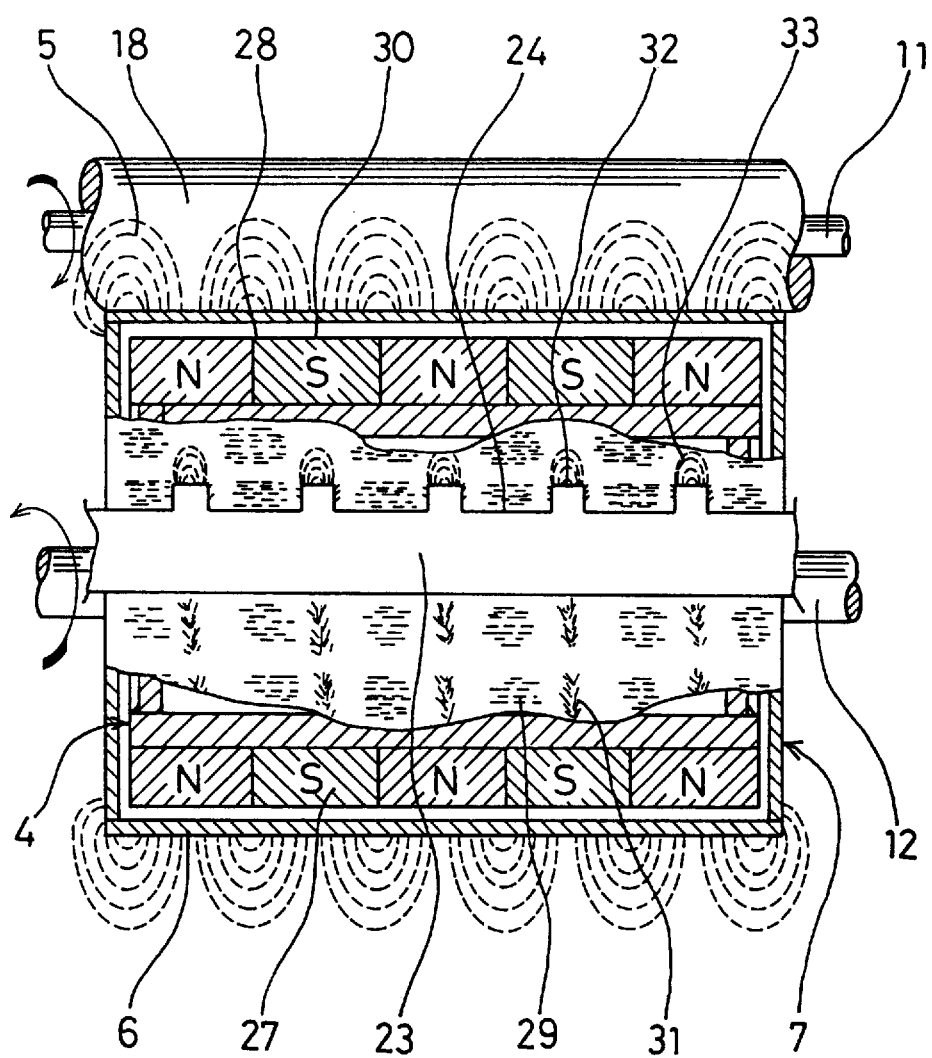
FIG. 2 is a reference drawing showing a partly cross sectional view of a fixed magnet-group cylinder, a comb-type guide plate, magnetic field around a squeezing roller, and the state of sludge of the magnetic separator for needle-shaped chips according to the present invention.
Figure 3:
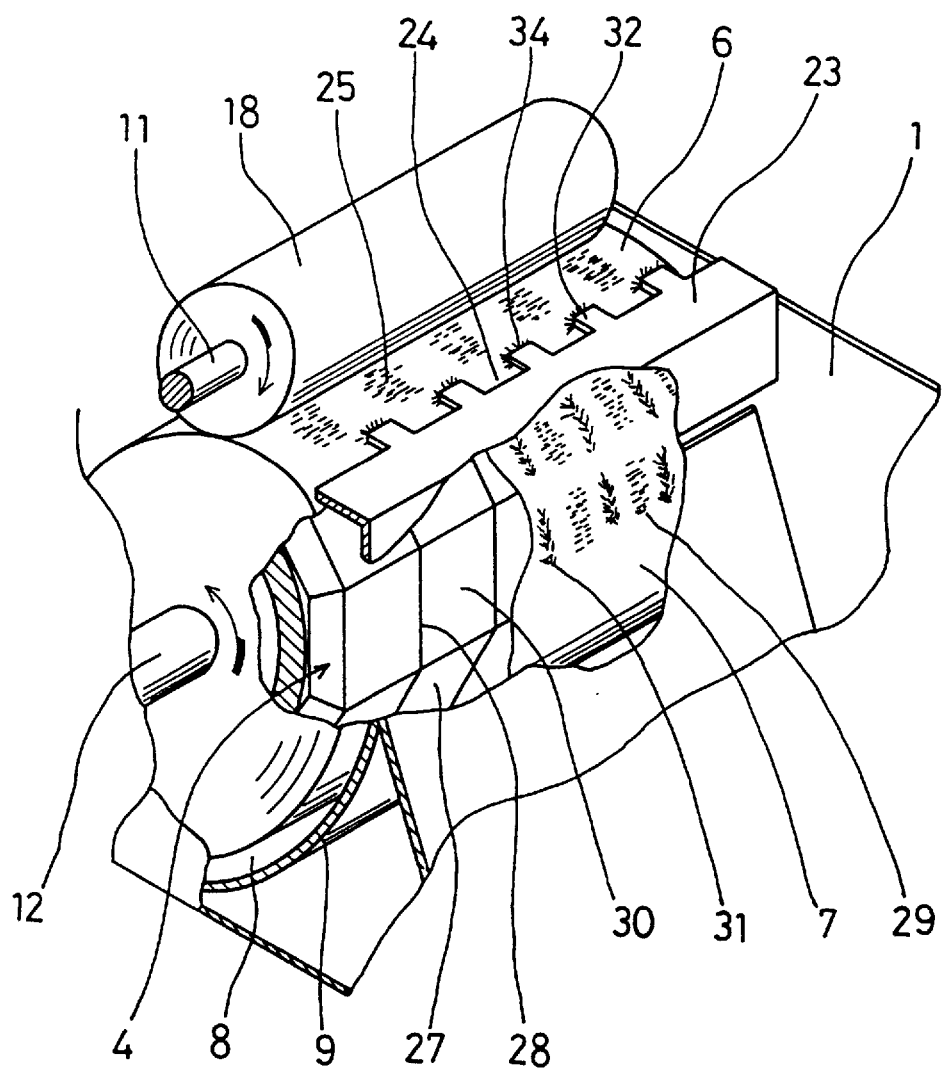
FIG. 3 is a perspective view taken in the direction of the arrow A in FIG. 1, illustrating the vicinity of the comb-type guide plate and the squeezing roller of the magnetic separator for needle-shaped chips according to the present invention.
Figure 4:
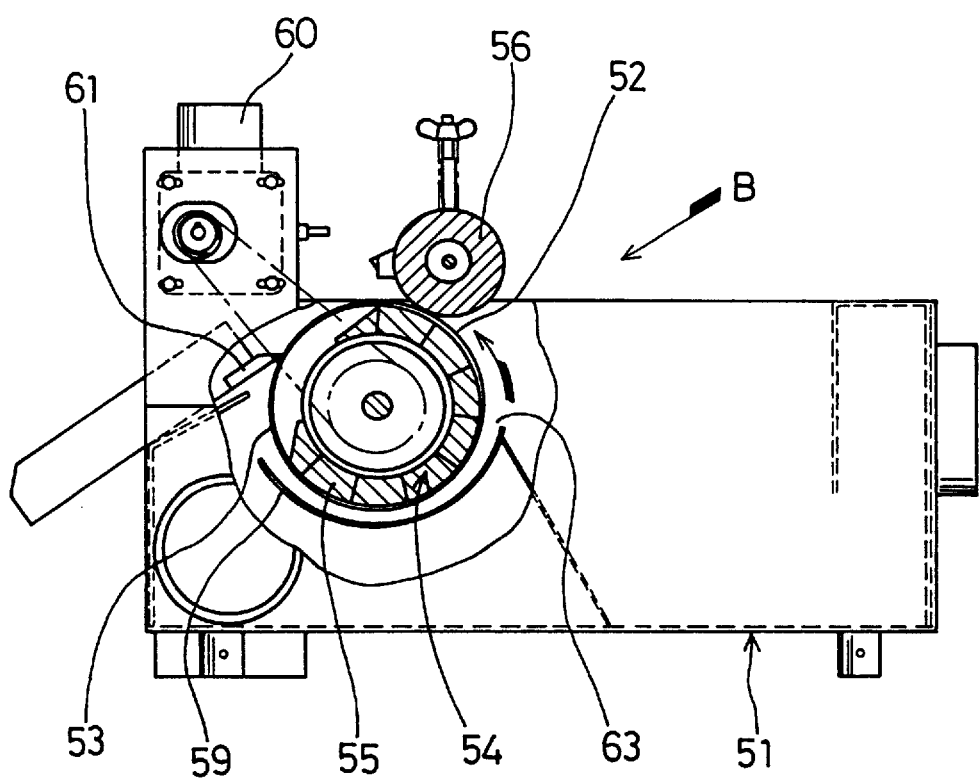
FIG. 4 is a front view, partially in section, of a conventional magnetic separator.
Figure 5:
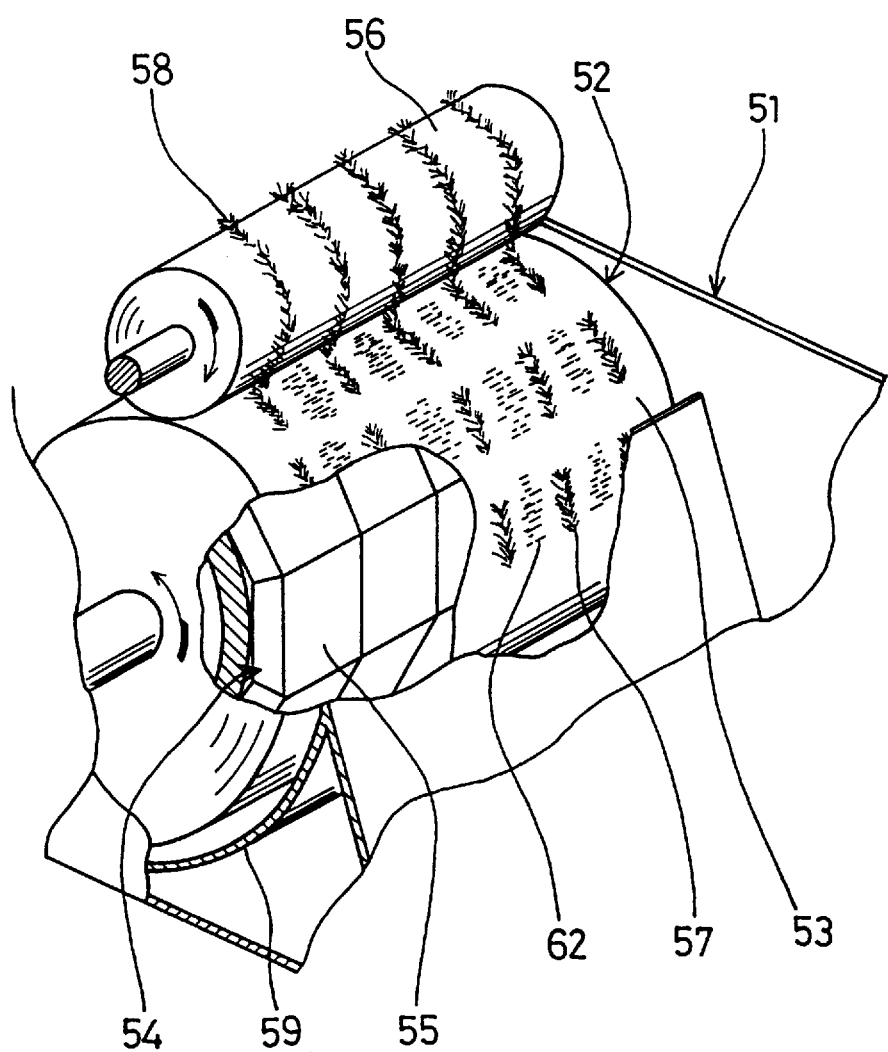
FIG. 5 is a perspective view take in the direction of the arrow B in FIG. 4, illustrating the vicinity of a squeezing roller of the conventional magnetic separator.

A magnetic separator for needle-shaped chips according to a preferred embodiment of the present invention will be described with reference to FIGS. 1 to 3.

A magnetic separator body 1 has an inlet port 2 and an outlet port 3. Between the inlet port 2 and the outlet port 3, there is a rotary cylinder 7 comprising a fixed magnet-group cylinder 4, and a rotary nonmagnetic tube 6 which forms by its inner wall a microspace with the magnet-group cylinder 4 and rotates concentrically with the magnet-group cylinder 4. A rotation shaft 12 of the rotary cylinder 7 extends outward from the magnetic separator 1. A sprocket wheel 13 is attached on the extended rotation shaft 12. A motor 15 with a reduction gear is fixed on a bracket 14 which extends from the magnetic separator body 1, and a small sprocket wheel 16 is attached to the motor 15 with the reduction gear. A sprocket chain 17 is provided to mesh with the teeth of the small sprocket wheel 16 and the sprocket wheel 13, thereby driving the rotary cylinder 7 to rotate in the direction of the arrows in FIGS. 1 to 3. A semicylindrical base plate 9 which is concentric with the rotary cylinder 7 is provided below the rotary cylinder 7, and a passage 8 is formed between the rotary cylinder 7 and the base plate 9. Above the rotary cylinder 7, there is a squeezing roller 18 held rotatably by a squeezing roller holder 10. Four threaded rods 22 stand two on each of the right and left sides of the magnetic separator body 1, and the squeezing roller holder 10 is penetrated by the threaded rods 22 in such a manner to allow free vertical movement of the squeezing roller holder 10 in a radial direction of the rotary cylinder 7 independently of each side of the threaded rods. A coil spring 21 of each threaded rod 22 urges the squeezing roller 18 to press the outer peripheral surface of the rotary cylinder 7 constantly. At the same time, owing to the above construction, a squeezing roller shaft 11 is movable in a certain range in the radial direction of the rotary cylinder 7. Just before the squeezing roller 18, a comb-type guide plate 23 is supported by right and left side plates of the magnetic separator body 1, and convex portions of the comb-type guide plate 23 are provided in the vicinity of the outer peripheral surface of the rotary cylinder 7 without contact. Besides, a scraper 20 is provided for scraping away sludge attached on the outer peripheral surface of the squeezing roller 18. A sludge stripping plate 19 provided near the outlet port 3 presses the outer peripheral surface of the rotary cylinder 7 in order to peel off attracted sludge 25.

In the operation of the magnetic separator having the above construction, when coolant including sludge mainly comprising needle-shaped chips made of a magnetic substance material enters into the magnetic separator through the inlet port 2, the sludge in the coolant is attracted on the outer peripheral surface of the rotary cylinder 7 while passing through the passage 8. As the rotary cylinder 7 rotates, the attracted sludge 25 is conveyed in the direction of the arrows in the figures, goes up above the liquid level, and liquid is extracted from the sludge by the squeezing roller 18. When the rotary cylinder 7 rotates further, the liquid extracted sludge is peeled off from the rotary cylinder 7 by the sludge stripping plate 19 and discharged. In this case, magnetic force 5 is strong around the adjoining portion 28 of the opposite poles of the magnets 27 of the fixed magnet-group cylinder 4. Therefore, in accordance with these magnetic lines of force, the needle-shaped chips in the sludge become lying attracted sludge 29 which is in parallel with the surface of the rotary cylinder 7. On the other hand, magnetic force 5 is weak at the intermediate portions 30 of the respective magnets 27. Therefore, in accordance with these magnetic lines of force, the needle-shaped chips of sludge become approximately vertically standing attracted sludge 31 in the shape of a jet from the surface of the rotary cylinder 7. The comb-type guide plate 23 of a magnetic substance material provided just before the squeezing roller 18 is magnetized by the magnets 27 of the magnet-group cylinder 4. The standing attracted sludge 31 is interrupted from going ahead by magnetic flux curtains 33 formed between the convex portions 32 of the comb-type guide plate 23 and the rotary cylinder 7, and becomes sludge 34 accumulated there. This accumulated sludge 34 is led to the lying attracted sludge 29 on both the sides where magnetic force is strong, namely, to the sides of convex portions 24 of the comb-type guide plate 23, joins the lying attracted sludge 29 there, and proceeds to the squeezing roller 18, is pressed thereby so that the liquid is extracted from the attracted sludge without any trouble.

Now, the advantages of the magnetic separator according to the preferred embodiment of the present invention will be described.

When the magnetic separator of the preferred embodiment of the present invention is used to purify, for the purpose of recycling, coolant including sludge mainly comprising needle-shaped chips made of a magnetic substance material, some needle-shaped chips in sludge attracted on the outer peripheral surface of the rotary cylinder 7 rise up due to the arrangement of the magnets 27 of the fixed magnet-group cylinder 4. The comb-type guide plate 23 of a magnetic substance material is provided just before the squeezing roller 18 and leads the attracted sludge 31 in which the needle-shaped chips rise up in the shape of a jet, to the position of the lying attracted sludge 29, thereby preventing the standing attracted sludge 31 from stabbing the squeezing roller 18. Accordingly, the construction of this preferred embodiment can lengthen the life of the squeezing roller 18, can improve the rate of extracting liquid form the sludge 25, and can operate the magnetic separator more effectively.

Obviously, many modifications and variations of the present invention are possible in the light of the above teachings. It is therefore to be understood that within the scope of the appended claims, the invention may be practiced otherwise than as specifically described.

What is claimed is:

1. A magnetic separator for separating chips made of a magnetic substance material from liquid with a sludge, comprising:
   a transfer means for transferring said chips, which transfers said chips attracted on a transfer surface of said transfer means toward a predetermined transfer direction, wherein said transfer means comprises a nonmagnetic rotary cylinder made of nonmagnetic substance material,
   a magnetic means for attracting said chips, which is disposed inside of said transfer means, has a N pole surface and a S pole surface disposed near said transfer surface of said transfer means and attracts said chips to said transfer surface of said transfer means, a pressing means for pressing said chips, said pressing means having an elastical member, presses said chips attracted on said transfer surface of said transfer means and separates said chips from said liquid, wherein said magnetic separator has a guide means which is disposed near said pressing means and faces said transfer surface of said transfer means with a predetermined distance in order to bring down said chips attracted and rising up near a central portion of said each pole surface of said magnet means before said chips are pressed by said pressing means.

2. The magnetic separator according to claim 1, wherein said magnetic means has plural N pole surfaces and S pole surfaces arranged alternatively in a different direction from said transfer direction along said transfer surface of said transfer means.

3. The magnetic separator according to claim 1, wherein said chips has a needle shaped form.

4. The magnetic separator according to claim 1, wherein said magnetic means comprises a stationary permanent magnet of which said each pole surface faces an inner peripheral surface of said nonmagnetic rotary cylinder.

5. The magnetic separator according to claim 1, wherein said elastical member comprises an elastical roller whose outer peripheral surface is pressed by an outer peripheral surface of said nonmagnetic rotary cylinder.

6. The magnetic separator according to claim 1, wherein said guide means comprises a plate member disposed in an axial direction of said nonmagnetic rotary cylinder and facing an outer peripheral surface of said nonmagnetic rotary cylinder with a predetermined distance.

7. The magnetic separator according to claim 6, wherein said plate member has plural convex portions disposed near said central portion of said each pole surface of said magnet means and bringing down said chips rising up in an radial direction from said outer peripheral surface of said nonmagnetic rotary cylinder.

8. The magnetic separator according to claim 7, wherein said plate member is made of magnetic substance material and comprises said plural convex portions and a main portion, said main portion is disposed apart from said outer peripheral surface of said nonmagnetic rotary cylinder and magnetically connects said plural convex portions.

* * * * *

UNITED STATES PATENT AND TRADEMARK OFFICE
CERTIFICATE OF CORRECTION

PATENT NO.   : 5,814,217
DATED        : September 29, 1998
INVENTOR(S)  : Minoru YAMAZAKI et al.

It is certified that error appears in the above-identified patent and that said Letters Patent is hereby corrected as shown below:

On the Title page, Item [30], Foreign Application Priority Data is incorrect. It should be:

--Jul. 23, 1996   [JP]   Japan..........8-225802--

Signed and Sealed this

Fourth Day of May, 1999

Attest:

Attesting Officer

Q. TODD DICKINSON

Acting Commissioner of Patents and Trademarks